United States Patent [19]

Yoshioka et al.

[11] Patent Number: 5,727,623
[45] Date of Patent: Mar. 17, 1998

[54] DEHUMIDIFIER HAVING TWO HEAT EXCHANGERS

[75] Inventors: Masuo Yoshioka; Hiromoto Ohta, both of Nagano; Toshiaki Yamagishi, Suzaka; Noritake Yoshioka, Nagano, all of Japan

[73] Assignee: Orion Machinery Co., Ltd., Nagano-ken, Japan

[21] Appl. No.: 778,238

[22] Filed: Jan. 8, 1997

[30] Foreign Application Priority Data

Jan. 16, 1996 [JP] Japan ................................. 8-023278

[51] Int. Cl.$^6$ ................................................ F28B 1/00
[52] U.S. Cl. ........................ 165/113; 62/93; 62/95; 165/167
[58] Field of Search ............................. 165/111, 112, 165/113, 167; 62/93, 95

[56] References Cited

U.S. PATENT DOCUMENTS

| | | | |
|---|---|---|---|
| 3,899,023 | 8/1975 | Zander et al. | 165/111 |
| 4,027,729 | 6/1977 | Bruhl | 165/111 |
| 4,242,110 | 12/1980 | Hynes | 55/269 |
| 4,287,724 | 9/1981 | Clark | 62/272 |
| 5,107,919 | 4/1992 | Basseen et al. | 165/47 |
| 5,275,233 | 1/1994 | Little | 165/111 |

FOREIGN PATENT DOCUMENTS 4-208392  7/1992  Japan ................................. 165/167

*Primary Examiner*—Allen J. Flanigan
*Attorney, Agent, or Firm*—Morrison Law Firm

[57] ABSTRACT

A pair of heat exchangers of generally cylindrical shape are coaxially coupled to the opposite ends of a cylindrical air-water separator. Each heat exchanger has a stack of heat transfer disks brazed together to define two alternating sets of intercommunicating flow paths. The first set of flow paths of the first heat exchanger receives high-temperature, high-humidity air under pressure, which is precooled by low-temperature, low-humidity air flowing to the second set of flow paths from the air-water separator. The precooled high-humidity air is directed through an internal passageway in the separator into the second heat exchanger, in which the air is cooled by heat exchange with a coolant. The cooled high-humidity air is then directed into the separator for reduction of the moisture. The low-temperature, low-humidity air is then afterheated by precooling the incoming high-temperature, high-humidity air in the first heat exchanger, for subsequent delivery to a load.

7 Claims, 5 Drawing Sheets

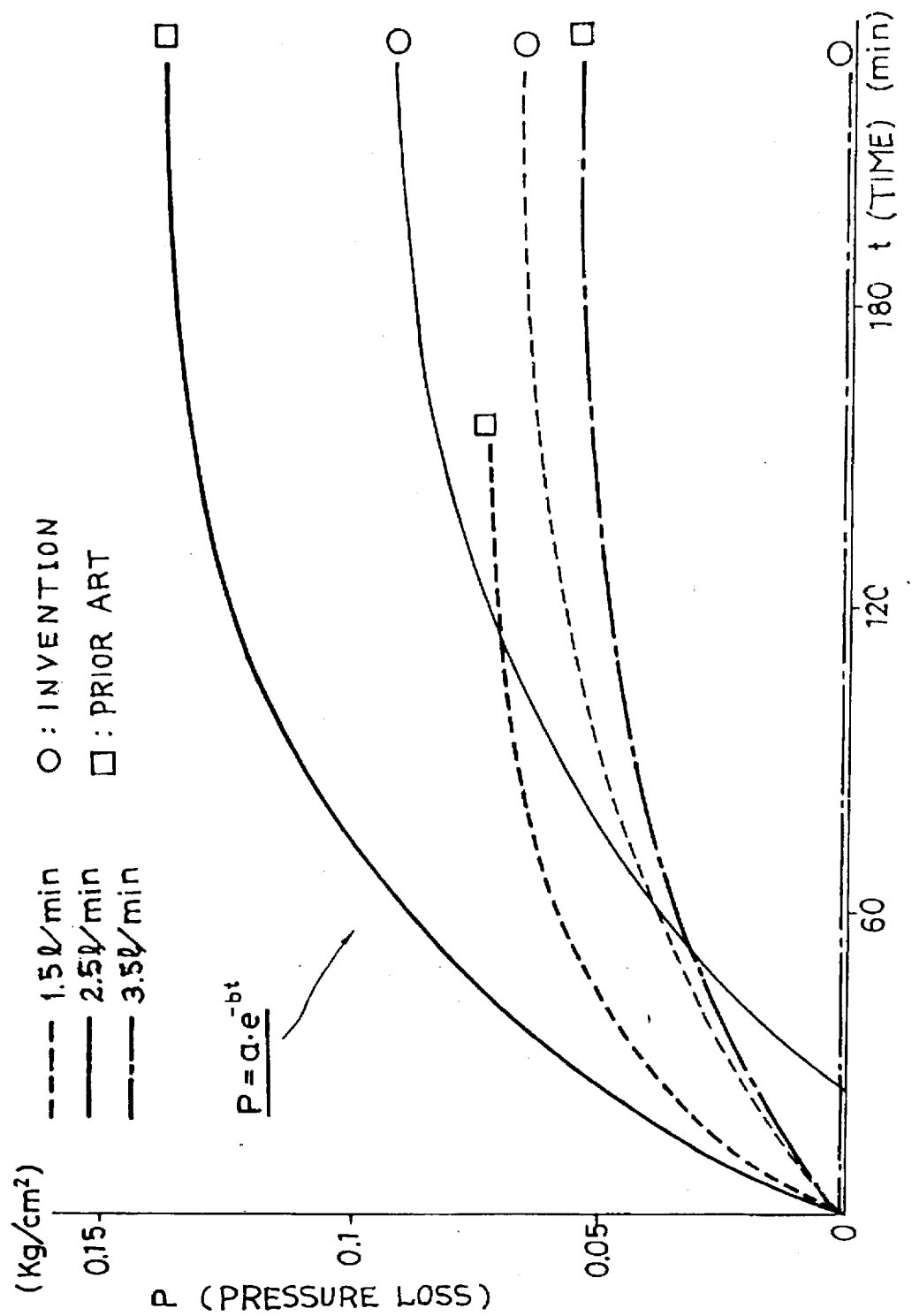

DEHUMIDIFIER HAVING TWO HEAT EXCHANGERS

BACKGROUND OF THE INVENTION

This invention relates to dehumidifiers, and more specifically to those for reducing the moisture in air under pressure preparatory to supply to pneumatic machines, among other applications. The dehumidifier according to the invention particularly features heat exchangers of improved construction described and claimed in an application filed concurrently herewith under the title, "Disk Heat Exchanger, and a Refrigeration System Including the Same."

Dehumidifiers have been known and used which employ heat exchangers for precooling and cooling the air before reducing its moisture content, as well as for afterheating the dehumidified air. Typical heat exchangers in use have been those of the plate type having a stack of heat transfer plates of rectangular shape held together by tie rods between a pair of end plates. Each plate has two pairs of spaced openings defined therethrough for the passage of two fluids of different temperatures, or of two different temperature streams of the same fluid. Two different kinds of gaskets are positioned between the heat transfer plates in order to form two alternating sets of flow paths for the two fluids by and between the heat transfer plates.

In operation one fluid is directed into the device through an entrance port in one end plate, made to flow through one of one pair of openings in each heat transfer plate, then up through one set of flow paths between the heat transfer plates, then through the other of that one pair of openings in each plate, and leaves the device through an exit port in the same, or other, end plate. The other fluid is directed into the exchanger through another entrance port in either end plate, made to flow through one of the other pair of openings in each heat transfer plate, then down through the other set of flow paths between the heat transfer plates, then through the other of that other pair of openings in each plate, and leaves the device through another exit port in the same, or other, end plate. Heat exchange between the two fluids takes place as they flow counter to each other through the two alternating sets of flow paths between the stacked plates.

Admittedly, the plate type heat exchanger of the foregoing construction and operation possesses some marked advantages. Its capacity is readily variable by increasing or decreasing the heat transfer plates, these being not permanently secured to one another but merely held together by tie rods between the end plates. For the same reason, moreover, the heat transfer plates can be thoroughly cleaned as required, which advantage makes the device admirably well suited for handling fluids that are easy to precipitate on the plates, or those which must be kept free from germs or other impurities.

Offsetting these advantages has been the extremely high pressure loss (difference between incoming and outgoing fluid pressures) per unit flow length of the plate heat exchanger in comparison with other known types, due obviously to the narrow flow paths between the heat transfer plates. This weakness has made it difficult to increase the size of the device. Additionally, in the case where gaskets are used between the plates, limitations have been imposed on fluid temperatures and pressures.

The instant applicants have also made many trial-and-error attempts to eliminate the noted drawbacks before completing this invention. One such attempt was to make longer the shorter dimension of each rectangular heat transfer plate, with the longer dimension unchanged, that is, to make each plate closer and closer to a square, with a view to an increase in heat transfer area. It has been discovered as a result that pressure loss increases as the heat transfer plates become more and more square in shape, particularly with regard to a fluid flowing from an opening adjacent the bottom edge of each plate to an opening adjacent the top edge thereof. Square shaped plates proved to be no solution.

Attempts have been made to overcome these drawbacks of plate heat exchangers, as by brazing the plates together with the consequent elimination of the gaskets. It is devices of this improved pressure-proof construction that have been used in dehumidification.

A typical dehumidifier of the kind under consideration has two such plate heat exchangers coupled together end to end, and an air-water separator external thereto and communicating with both heat exchangers by way of conduits. One heat exchanger has an inlet port for admitting high-temperature, high-humidity air under pressure, which is precooled by low-temperature, low-humidity air from the separator as they flow counter to each other through the two alternating sets of flow paths in that heat exchanger. The precooled air is then directed into the other heat exchanger in order to be further cooled by similar counterflow heat exchange with a refrigerant or other coolant. The cooled high-humidity air is then directed through one conduit into the separator for moisture reduction. Then, directed back into the first heat exchanger through another conduit, the low-temperature, low-humidity air is afterheated by precooling, as aforesaid, the incoming high-temperature, high-humidity air. The afterheated low-humidity air flows from the first exchanger to a load.

An objection to the dehumidifier of the foregoing prior art construction arises from the rectangular shape of the heat transfer plates and from the resulting boxlike shape of each heat exchanger. By reason of this very shape it has been difficult to provide the heat exchangers with drains for withdrawing the condensate water produced necessarily during the cooling of the air.

A conventional remedy to this difficulty has been the provision of the water separator, as large in size as each heat exchanger, under or by the side of the heat exchangers. The separate separator has required, of course, a conduit from one end of one heat exchanger and another conduit to the distant end of the other heat exchanger. The separator with the associated conduit system has made the prior art dehumidifier inconveniently large in space requirement, which has included the space wasted by the conduit system. This conduit system has also caused significant thermal loss, represented an inconvenience in packaging and shipment of the device, and required time and labor for connection to the heat exchangers and to the separator at the time of dehumidifier installation.

SUMMARY OF THE INVENTION

The present invention seeks to streamline the heat exchangers and air-water separator into a compact dehumidifier that is far easier of manufacture, packaging, transportation, and installation than heretofore.

The invention also seeks to provide a dehumidifier that is low in thermal loss and pressure loss, pressure-proof, maintenance-free, and high in the efficiency of heat exchange.

According to the invention, stated in brief, a dehumidifier is provided which comprises an air-water separator having a vessel pressure-tightly defining a separator chamber with a water drain, and a first and a second heat exchanger mounted to the opposite ends of the separator. The separator is formed to include a through passageway extending therethrough for intercommunicating the two heat exchangers. Both first and second heat exchangers are alike in having a plurality of heat transfer walls interconnected so as to define two alternating sets of flow paths therebetween. The first heat exchanger has a first set of flow paths in communication on one hand with an inlet port for admitting high temperature, high-humidity air under pressure and, on the other hand, with the through passageway, and a second set of flow paths in communication with the separator chamber on one hand and, on the other hand, with an outlet port. The second heat exchanger has a third set of flow paths in communication with the through passageway on one hand and, on the other hand, with the separator chamber, and a fourth set of flow paths through which flows a coolant from an external source.

Directed into the first set of flow paths in the first heat exchanger, the incoming high-temperature, high-humidity air under pressure is therein precooled by heat exchange with outgoing low-temperature, low-humidity air flowing in the second set of flow paths, the latter air having been supplied from the second heat exchanger via the separator. The precooled high-humidity air flows from the first set of flow paths to the through passageway and thence to the third set of flow paths in the second heat exchanger, therein to be further cooled by heat exchange with the coolant in the fourth set of flow paths. The cooled high-humidity air is directed from the third set of flow paths to the separator chamber therein to be reduced in humidity. The resulting low-temperature, low-humidity air flows from the separator chamber to the second set of flow paths in the first heat exchanger in order to be afterheated, and so further reduced in humidity, by precooling, as above, the incoming high-temperature, high-humidity air in the first set of flow paths. The afterheated low-humidity air leaves the device through the outlet port.

It should be appreciated that the two heat exchangers and the air-water separator are coupled together in line. No external conduits, which have so far been necessary with the coverings of heat insulating material, are required for communicating the separator with the heat exchangers, or for intercommunicating the heat exchangers. Thus the dehumidifier according to the invention defeats the noted inconveniences heretofore encountered because of the presence of external conduits.

Preferably, the separator vessel may be formed to include a pair of opposite flat end walls, and each of these end walls may also form one end of each heat exchanger. The through passageway may be formed either by a conduit extending through the separator chamber from one end wall to the other, or by a simple partition dividing the interior of the separator vessel into the through passageway and the separator chamber. The heat exchangers may be any of various known designs such as the one having a stack of rectangular, corrugated plates joined together via gaskets by tie rods, or brazed together, or the one having the plates enclosed in a rigid shell.

However, the most desirable heat exchanger construction is the one in which the heat transfer walls are more or less disklike in shape. The disk heat exchanger is such that each heat transfer disk has two pairs of spaced openings defined therethrough. All the disks are peripherally joined together, as by brazing, and each disk is additionally joined, also as by brazing, to an adjacent disk on one side thereof at their edges bounding one pair of openings, and to another disk on another side thereof at their edges bounding the other pair of openings. Two alternating sets of flow paths are thus formed by and between the heat transfer disks.

Each disk heat exchanger is therefore generally cylindrical in shape, which shape makes the device more pressure-proof than plate heat exchangers. As an additional advantage, flowing into a flow path between any two neighboring disks from an entrance opening in one such disk, a fluid will encounter no such straight edges or corners as those of the rectangular plates that obstruct its flow, but will be guided by the annular disk edges to flow smoothly and uniformly toward the exit opening of that flow path. Although the brazing of the disks makes it impossible to disassemble the device for cleaning, this is more than amply offset by the fact that, perhaps with proper filtration of air, there will be no such accumulation of solids as may impede airflow or reduce the efficiency of heat exchange for a very extended period of time.

The air-water separator vessel for use with the disk heat exchangers should preferably be tubular in shape. Beside being improved in mechanical strength, the tubular separator vessel affords smooth airflow and ready condensation of the water vapor in the air. Two disk heat exchangers may be coaxially coupled to the opposite ends of the separator vessel of the same diameter, thereby providing a compact, streamlined dehumidifier unseen heretofore.

The above and other objects, features and advantages of this invention and the manner of realizing them will become more apparent, and the invention itself will best be understood, from a study of the following description and appended claims, with reference had to the attached drawings showing a preferable embodiment of the present invention.

BRIEF DESCRIPTION OF THE DRAWINGS

FIG. 6 is a graphic demonstration of the results of the comparative pressure loss tests conducted by use of the FIG. 5 setup.

DESCRIPTION OF THE PREFERRED EMBODIMENT

General

Figure 1:
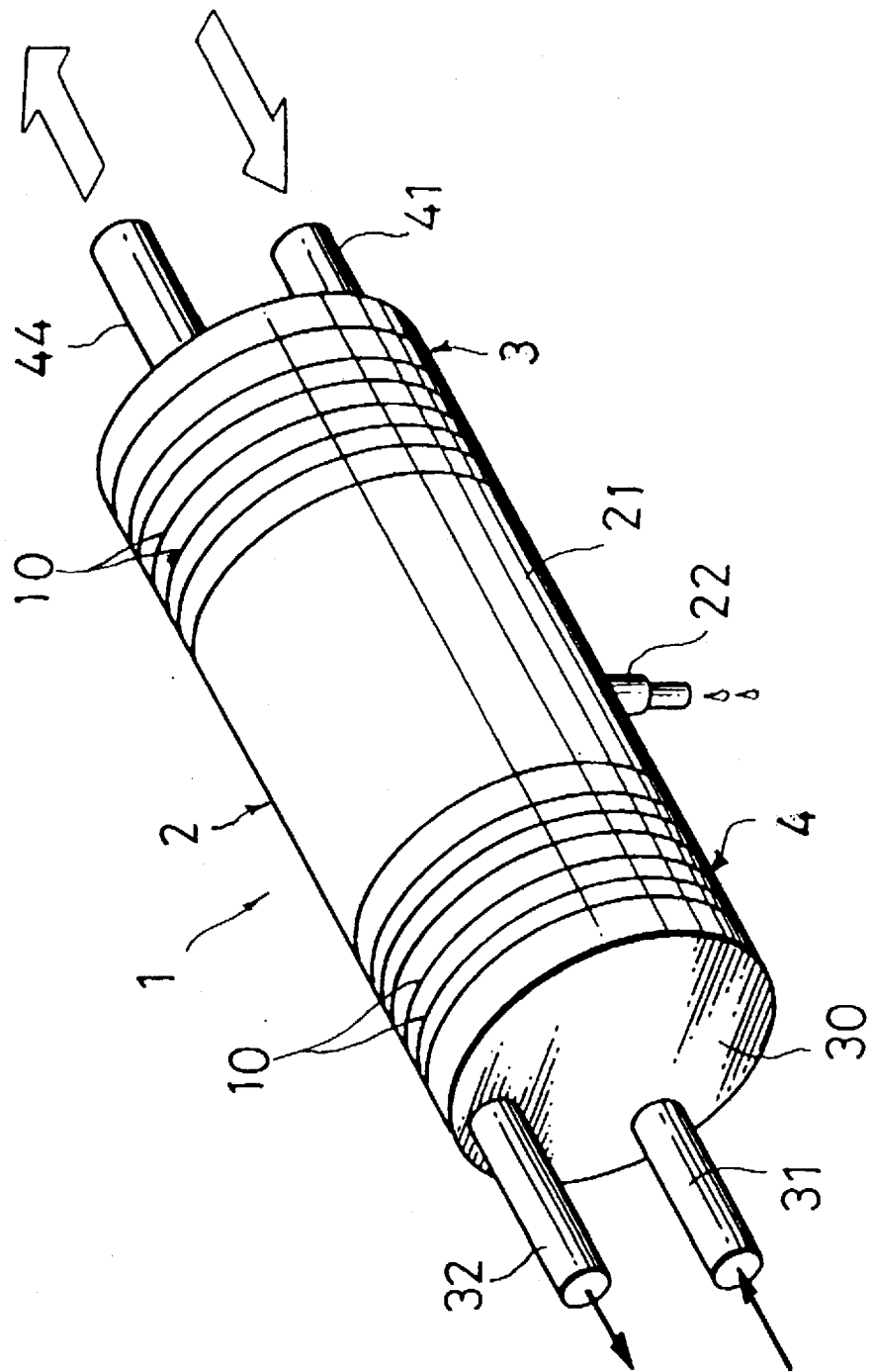
FIG. 1 shows in perspective the dehumidifier constructed in accordance with the novel concepts of the present invention.

The invention will now be described more specifically as embodied by way of example in the dehumidifier shown in FIGS. 1 and 2 and therein generally designated 1. Broadly, the exemplified dehumidifier 1 is a streamlined combination of an air-water separator 2 of cylindrical shape, and first 3 and second 4 heat exchangers, each also cylindrical in shape, coaxially coupled to the opposite ends of the separator. The two heat exchangers are essentially identical in construction, though distinctly different in function, so that the constructional description of one applies to the other except where otherwise noted.

Air-Water Separator

Figure 2:
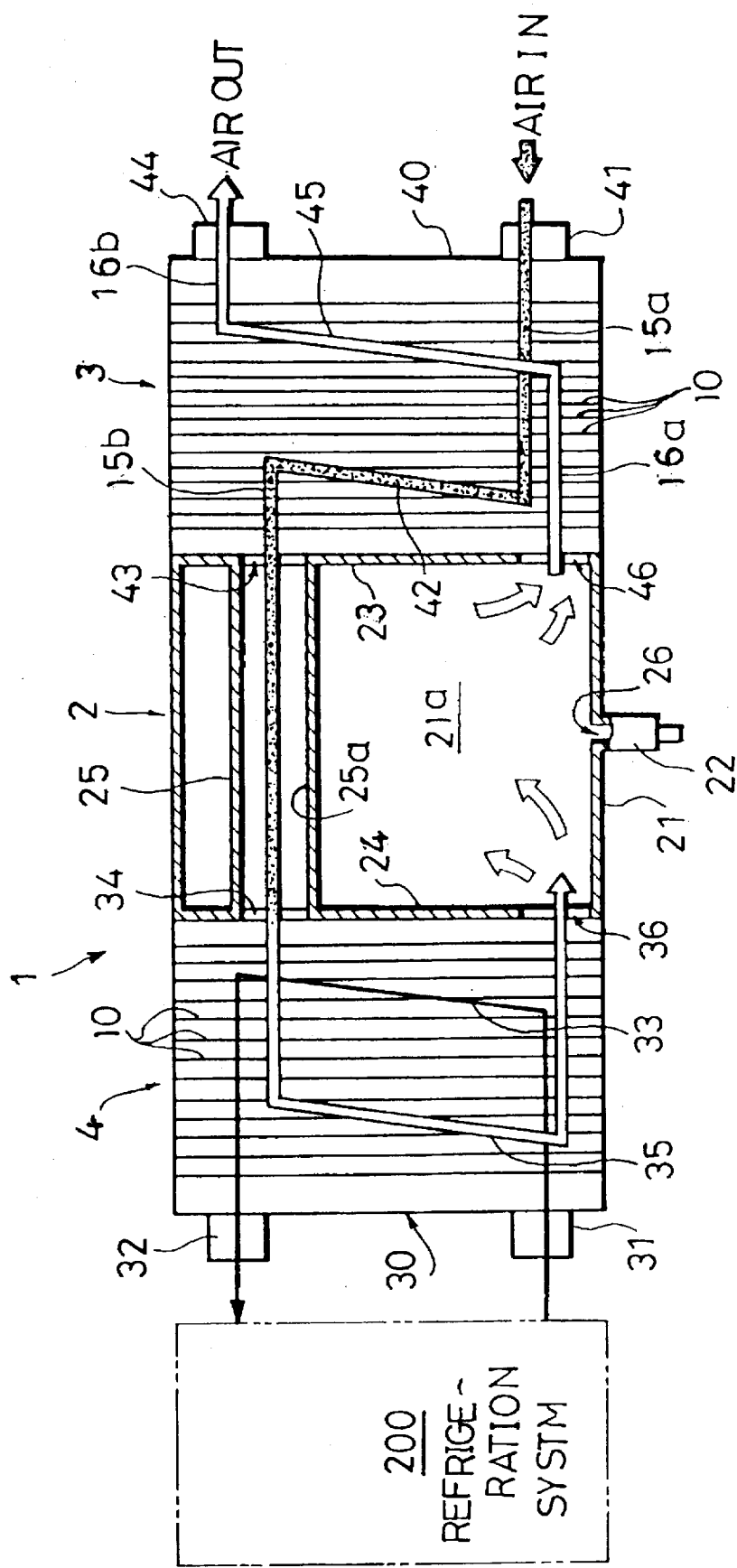
FIG. 2 is an enlarged, diagrammatic axial section through the FIG. 1 dehumidifier, the view being explanatory in particular of how the air and the coolant flow in the device.

As best seen in FIG. 2, the air-water separator 2 has a pressure-tight vessel 21 of tubular shape, complete with a pair of opposite end walls 23 and 24, defining a separator chamber 21a in which air is to be separated from the moisture. The separator vessel 21 is positioned recumbently, with the heat exchangers 3 and 4 attached directly to its opposite end walls 23 and 24. More exactly, however, the heat exchangers 3 and 4 are not "attached" to the separator vessel 21 because the end walls 23 and 24 of the separator vessel double as those of the heat exchangers. Thus the separator 2 and the heat exchangers 3 and 4 are integrally combined, with no clear boundaries therebetween.

At 22 is seen a drain provided to the separator vessel 21 for withdrawing the water therefrom. Preferably, the drain 22 should be equipped with a solenoid valve, not shown, which opens in response to a signal from a level sensor, also not shown, within the separator vessel 21. The level sensor can be of any known or suitable construction such as that having a float, or that operating electrostatically.

A conduit 25 extends through the separator chamber 21a between the pair of opposite separator end walls 23 and 24. The conduit 25 defines a through passageway 25a out of direct communication with the separator chamber 21a. The through passageway 25a is intended for the travel of the air from the first 3 to the second 4 heat exchanger internally of the separator 2, without bypassing the same. The same objective could be accomplished, however, by partitioning the interior of the separator vessel 21 into the separator chamber 21a and the through passageway 25a.

Heat Exchangers

As will be seen also from FIG. 2, each heat exchanger 3 or 4 comprises a plurality or multiplicity of heat transfer walls 10 of substantially disklike shape and heat-conducting material in stacked, spaced relationship to one another. The modifier "substantially" is used here because the walls need not be exactly circular but may be, for example, elliptic. However, in case the air-water separator vessel 21 is tubular in shape, the heat transfer walls 10 should preferably take the form of disks of the same diameter as the separator vessel. The heat transfer walls 10 will therefore be hereinafter referred to as the disks.

Figure 3:
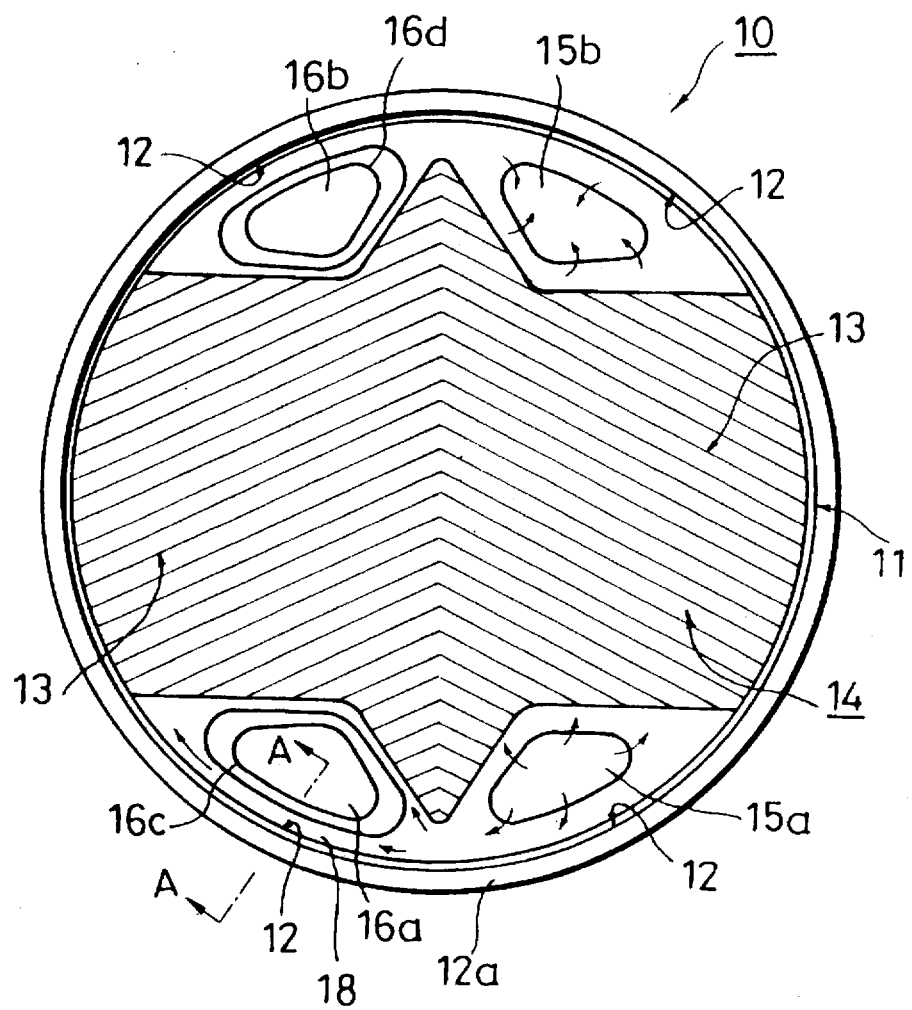
FIG. 3 is an enlarged elevation of one of the heat transfer disks of each heat exchanger used in the FIGS. 1 and 2 dehumidifier.
Figure 4:
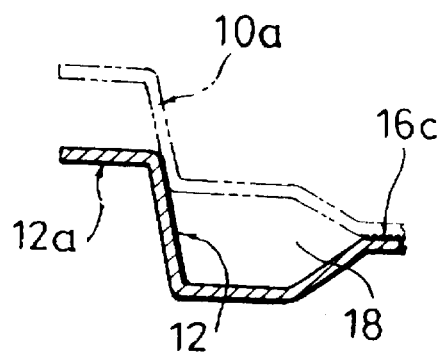
FIG. 4 is a still more enlarged, fragmentary section taken along the line A—A in FIG. 3 and showing in particular the peripheral flange of each heat transfer disk.

As better illustrated in FIG. 3, each heat transfer disk 10 has an annular flange 12 on its periphery and an annular rim 12a further extending radially outwardly from the flange. The flange 12 gradually increases in diameter as it extends from the disk 10 toward the rim 12a, for ease in stacking the disks in axial alignment. A series of corrugations 13 are formed, as by pressing, in herringbone pattern on most part of each disk surface, leaving a pair of flat surface portions in diametrically opposite positions on both sides of the corrugations. A heat conducting surface 14 is thus formed on each side of the disk 10.

Defined through the flat surface portions of each heat transfer disk 10 are a first pair of spaced openings 15a and 15b for the entrance and exit of one fluid, and a second pair of spaced openings 16a and 16b for the entrance and exit of another fluid for heat exchange with said one fluid. Each generally elliptic in shape, the openings extend along the peripheral flange of each disk with a spacing 18, FIGS. 2 and 3, therebetween. The spacings serve as fluid passageways designed for smoother fluid flow from the entrance to the exit openings, as will be later discussed in more detail. Further the two pairs of openings 15a, 15b, 16a and 16b are all so shaped, sized, and arranged that they are of bilateral symmetry with respect to two orthogonal axes contained in the plane of the disk and intersecting at the geometric center of the disk.

All the heat transfer disks 10 are stacked in axial alignment, with the two pairs of openings 15a, 15b, 16a and 16b all in alignment along the disk axis, with the flange 12 of each disk partly engaged in the flange of the next disk as in FIG. 3, and with the herringbone corrugations 13 of the disks oriented alternately in opposite directions. The orientation of the herringbone corrugations in two opposite directions does not require the preparations of two different kinds of disks as the two pairs of openings in each disk are of bilateral symmetry with respect to the noted two orthogonal axes. The interengaging flanges 12 of all the disks 10 are integrally joined together, as by brazing, with the consequent creation of spaces between the disks.

Additionally, each heat transfer disk 10 is brazed or otherwise joined to one adjacent disk on one side thereof at their edges bounding the first pair of openings 15a and 15b, and to the other adjacent disk on the other side thereof at their edges 16c and 16d bounding the second pair of openings 16a and 16b. Consequently, two sets of flow paths for two fluids are formed alternately by and between the heat transfer disks 10. Although the showing of FIG. 2 is very schematic, it will nevertheless be seen that the two alternating sets of flow paths of the first heat exchanger 3 are therein designated 42 and 45, and those of the second heat exchanger 4 designated 33 and 35.

For integrally joining the heat transfer disks 10 as above, these disks may themselves be fabricated from brazing sheets and heated in a furnace. Alternatively, the disks with a brazing filler metal therebetween may be heated in a vacuum furnace. Any of these and other joining methods may be employed according to the material of the disks.

Structured and combined as above, the heat transfer disks 10 of the first heat exchanger 3 are caught between an end disk 40 and the disklike end wall 23 of the air-water separator 2, as diagrammatically illustrated in FIG. 2. The heat transfer disks 10 of the second heat exchanger 4 are likewise held between an end disk 30 and the other end wall 24 of the separator 2. The end disk 40 of the first heat exchanger 3 has an entrance port 41 for communication with an air compressor, not shown, in order to admit high-humidity, high-temperature air under pressure to be dehumidified. Also formed in the end disk 40, an exit port 44 is for the discharge of dehumidified air. The end disk 30 of the second heat exchanger 4 has an entrance port 31 for communication with a refrigerant expander, not shown, of a refrigeration system 200 in order to admit a refrigerant, and an exit port 32 for returning the used refrigerant to the refrigerant compressor, not shown, of the refrigeration system.

With reference again to FIG. 3, let 15a in each heat transfer disk 10 of the first heat exchanger 3 be the entrance opening in direct communication with the entrance port 41, FIG. 2, in the first heat exchanger end disk 40, and 15b the exit opening in direct communication with the exit port 44. Flowing into the aligned entrance openings 15a in all the heat transfer disks 10 of the first heat exchanger 3 from the entrance port 41, the high-humidity, high-temperature air under pressure will be distributed into, and flow up, the first set of flow paths 42 between the disks, rejoin at the exit openings 15b, and flow out of the first heat exchanger and into the through passageway 25a.

The opening 16a in each heat transfer disk 10 of the first heat exchanger 3 is then in direct communication with an exit port 46 in the separator vessel end wall 23 for receiving low-humidity, low-temperature air therefrom. The opening 16b is open to the exit port 44. Thus the air will flow from the exit port 46 into the aligned openings 16a in all the heat transfer disks 10, then flow up the second set of flow paths between the disks, rejoin at the other aligned openings 16b, and leave the device from the exit port 44. Heat exchange between the fluids will take place mostly as they flow up the two alternating sets of flow paths between the heat transfer disks 10.

Particular attention is invited to the flow modes of the fluids being distributed from the entrance openings 15a or 16a into the two alternating sets of flow paths between the disks. As indicated by the arrows over the entrance opening 15a in FIG. 3, the fluid will come smoothly streaming out in all directions around the opening. Even those streams which are directed away from the exit opening 15b will be guided by the peripheral flange 12 of the disk to move toward the exit opening.

The left hand half, as viewed in FIG. 3, of the flow path between any two neighboring disks 10 might seem very easy to give rise to pressure loss, the left half being farther away from both entrance and exit openings than is the right half. However, by virtue of the arcuate passageway 18 between the opening 16a and the disk flange 12, the fluid will not stagnate at the left half of the flow path but will flow far more smoothly toward the exit opening 15b than if no such arcuate passageways were present or if rectangular plates were used in place of the disks. At the exit opening 15b, too, the disk flange 12 itself and the arcuate passageways between the openings 15b and 16b and the disk flange will guide part of the fluid, helping the fluid to stream smoothly into the exit opening from all directions, as indicated also by the arrows in FIG. 3.

Such smooth fluid flow in the flow paths between the disks 10 is essential for efficient heat exchange. Fluids traveling smoothly, moreover, will deposit less solids on the disks, maintaining the efficiency of the device for a prolonged period of time. This advantage is all the more important because the disks are brazed together and so incapable of disassembly for cleaning.

The second heat exchanger 4 is operationally different from the first 3 in that the two fluids flow counter to each other for heat exchange. Let us assume that the coolant flows from the entrance port 31 to the openings 15a, then up one set of flow paths 33 between the disks 10, and then to the openings 15b, leaving the device from the exit port 32. Then the air from the through passageway 25a will first flow to the openings 16b, then down the other set of flow paths 35 between the disks 10, and then to the openings 16a leading to the port 36 in the separator vessel end wall 24. Heat exchange will occur as one fluid flows up one set of flow paths 33, and the other fluid down the other set of flow paths 35. As far as each flow path is concerned, however, the behavior of the fluid is similar to the above described flow modes of the fluid in each flow path of the first heat exchanger 3. Therefore, despite the difference in the mode of operation, the second heat exchanger 4 gains the same merits as the first 3.

Figure 5:
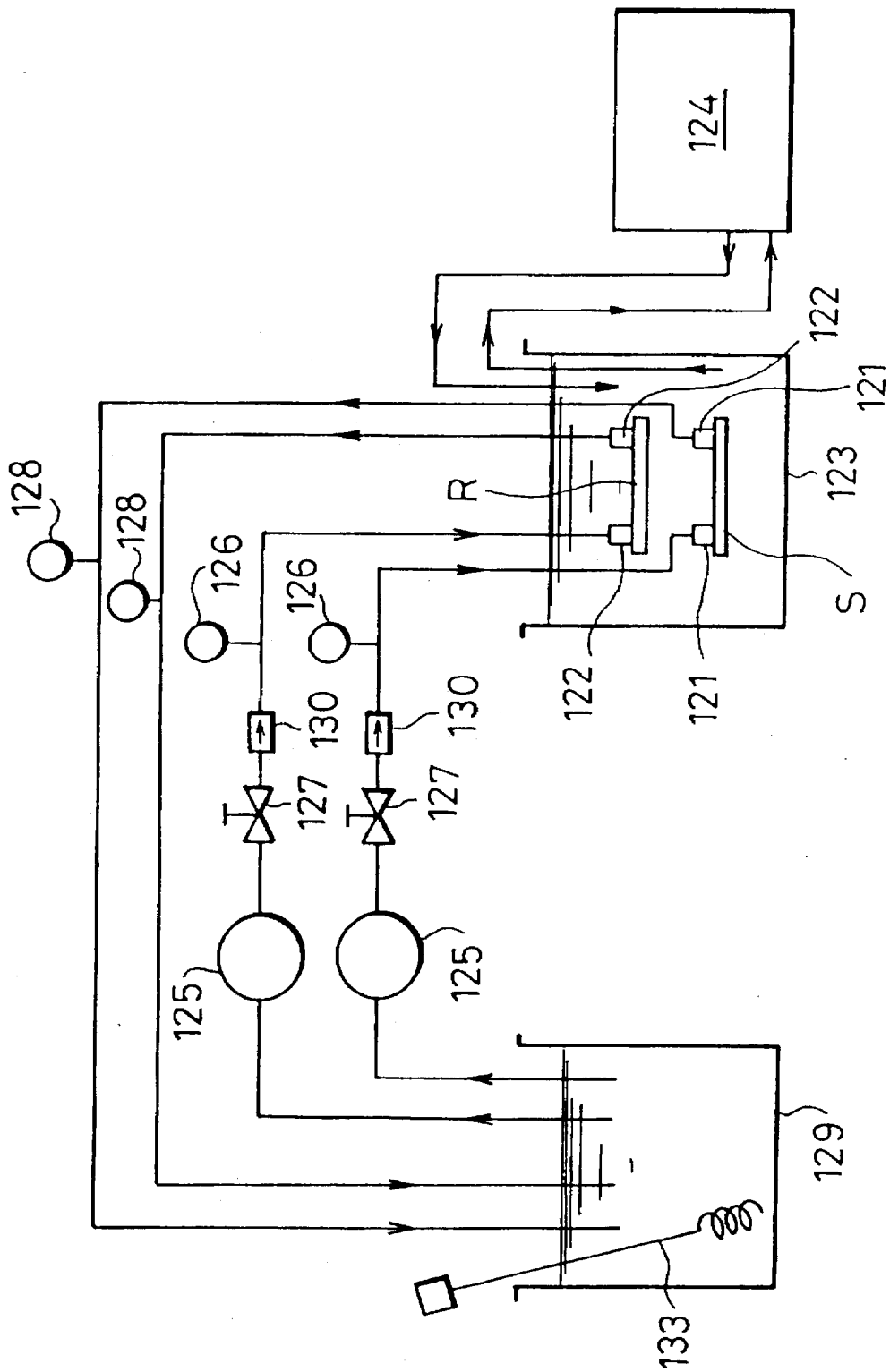
FIG. 5 is a diagram explanatory of a setup used for comparing the pressure losses of two test heat exchangers, one being of the disk type used in the dehumidifier according to the invention, the other being of the rectangular plate type according to the prior art.

The advantage of the disk heat exchanger over the rectangular plate heat exchanger will become even more apparent from the following comparative experiments conducted by the present applicants. FIG. 5 illustrates the setup used fro the experiments. There were prepared two test devices S and R. The device S was a plate heat exchanger. The other device R was a disk heat exchanger of the same construction as the heat exchangers 3 and 4 used in the dehumidifier 1 according to the invention. Each device was provided with a pair of nozzles 121 and 122 of the same diameter for the inflow and outflow of one fluid. Both devices were also alike in having their disks or plates fabricated from aluminum, in having herringbone corrugations alternately oriented in opposite directions, and in having the same number of disks or plates of the same surface area.

Both test devices R and S were submerged in water within a vessel 123 which was held at 5° C. by a cooling device 124. The entrance nozzles of the test devices were communicated with a vessel 129 containing a saturated alum solution, via respective conduits each having a pump 125, a cock 127, an entrance pressure meter 126, and a flowmeter 130. The exit nozzles of the test devices were also communicated with the vessel 129 via respective conduits each having an exit pressure meter 128. The alum solution was held at 60° C. by a heater 133. The alum solution was pumped through the test devices at rates of 1.5, 2.5 and 3.5 liters per minute, and the pressure losses (differences between the readings of the entrance and exit pressure meters 126 and 128) of both devices were ascertained at time intervals of 10 to 20 minutes at each flow rate.

The results are graphically represented in FIG. 6. It is clear from this graph that the disk heat exchanger is significantly less in pressure loss than the plate device at each flow rate. Particularly, at 3.5 liters per minute, and obviously at higher flow rates, too, the disk device suffers little or no pressure loss even after three hours of continued operation.

From the pressure loss curves of FIG. 6 there can be obtained the empirical formula, $P=a \cdot e^{-bt}$, where P is the pressure loss, a and b constants, t time, and e the base of an exponential function. From this formula the time constant T can be computed by the equation $T=1/b$ for each curve in order to provide quantitative measures of the immunity of each device from clogging at the selected flow rates. The results, tabulated below, indicate the superiority of the disk heat exchanger over the plate type.

TABLE

|  | Time Constant (Min.) | | |
| --- | --- | --- | --- |
|  | 1.5 l/min. | 2.5 l/min. | 3.5 l/min. |
| Plate | 37 | 74 | 74 |
| Disk | 79 | 94 |  |

Operation

The high-temperature, high-humidity air to be dehumidified will first flow under pressure into the first heat exchanger 3 through the entrance port 41 and up one set of flow paths 42 therein. Flowing up the other set of flow paths 45 in the firs heat exchanger 3 is the low-temperature, low-humidity air coming in from the separator chamber 21A through its exit port 46. The high-temperature, high-humidity air will therefore be precooled in the first heat exchanger 3 and, traveling through the through passageway 25a in the separator vessel 21, enter the second heat exchanger 4.

The precooled high-humidity air will flow down one set of flow paths 35 in the second heat exchanger 4, whereas the refrigerant will flow up the other set of flow paths 33. As the two fluids thus run counter to each other, the high-humidity air will be further cooled by the refrigerant to a temperature below the dew point. This final cooling will cause the water vapor in the air to begin to condense.

Laden with the mistlike condensate, the air will stream through the port 36 into the much larger separator chamber 21a. The mist-laden air will swirl along the walls of this chamber 21a and, in so doing, deposit the condensate on the chamber walls. As desired, baffles may be provided in the separator chamber 21a to expedite the deposition of the condensate thereon.

The low-temperature, low-humidity air thus obtained will then flow through the port 46 back into the first heat exchanger 3, this time to move up the set of flow paths 45 between the disks 10 and so to precool the high-temperature, high-humidity air flowing up the other set of flow paths 42. The precooling of the incoming air by the outgoing air is tantamount to the afterheating, and additional dehumidifying, of the outgoing air by the incoming air. The dehumidified air will leave the device through the exit port 44.

Notwithstanding the foregoing detailed disclosure, it is not desired that the present invention be limited by the exact showing of the drawings or the description thereof. A variety of changes may be made to conform to design preferences or to the requirements of each specific application of the invention without departure from the spirit of the invention as expressed in the attached claims.

What is claimed is:

1. A device for dehumidifying high-temperature, high-humidity air supplied under pressure, the dehumidifier comprising:

(A) an air-water separator comprising:
      (a) a pressure-tight separator vessel defining a separator chamber in which water is to be separated from air, the separator vessel having a pair of opposite ends;
      (b) drain means for withdrawing water from the separator chamber; and
      (c) means pressure-tightly defining a through passageway extending through the separator vessel from one end to the other thereof;

(B) a first heat exchanger disposed contiguous to one end of the separator vessel, the first heat exchanger comprising:
      (a) a plurality of heat transfer walls interconnected so as to define alternately therebetween a first and a second set of flow paths for heat exchange therebetween, the first set of flow paths communicating with the through passageway in the separator vessel, the second set of flow paths communicating with the separator chamber;
      (b) means for admitting high-temperature, high-humidity air under pressure into the first set of flow paths and thence into the through passageway in the separator vessel; and
      (c) means for discharging low-humidity air from the second set of flow paths, the low-humidity air being directed from the separator chamber into the second set of flow paths in order to be afterheated by the high-temperature, high-humidity air in the first set of flow paths by heat exchange; and (C) a second heat exchanger disposed contiguous to the other end of the separator vessel, the second heat exchanger comprising:
      (a) a plurality of heat transfer walls interconnected so as to define alternately therebetween a third and a fourth set of flow paths for heat exchange therebetween, the third set of flow paths communicating with the through passageway in the separator vessel for receiving therefrom the high-humidity air which has been precooled by afterheating the low humidity air in the first heat exchanger, and also with the separator chamber;
      (b) means for admitting a coolant into the fourth set of flow paths for cooling the precooled high-humidity air in the third set of flow paths by heat exchange, the cooled high-humidity air being directed from the third set of flow paths into the separator chamber therein to be reduced in humidity; and
      (c) means for discharging the coolant from the fourth set of flow paths.

2. The dehumidifier of claim 1 wherein the heat transfer walls of the first and the second heat exchangers are all of substantially dislike shape.

3. The dehumidifier of claim 2 wherein each heat transfer wall of the first and the second heat exchangers has an annular flange extending along the periphery thereof, the flanges of the neighboring heat transfer walls being directly joined to each other so as to provide the flow paths between the heat transfer walls.

4. The dehumidifier of claim 3 wherein each heat transfer wall of the first and the second heat exchangers has two pairs of spaced openings defined therethrough for the passage of two fluids of different temperatures, the two pairs of openings in each heat transfer wall being situated adjacent the peripheral flange of that heat transfer wall, with the flange serving to uniformly distribute the fluid throughout the flow path between every two heat transfer walls.

5. The dehumidifier of claim 4 wherein the two pairs of openings in each heat transfer wall are each substantially elliptical in shape, elongated along the peripheral flange of each heat transfer wall.

6. A device for dehumidifying high-temperature, high-humidity air supplied under pressure, the dehumidifier comprising:

(A) an air-water separator comprising:
      (a) a pressure-tight separator vessel defining a separator chamber in which water is to be separated from air, the separator vessel being substantially tubular in shape and having a pair of opposite end walls;
      (b) drain means for withdrawing water from the separator chamber; and
      (c) means pressure-tightly defining a through passageway out of direct communication with the separator chamber;

(B) a first heat exchanger of generally cylindrical shape coaxially attached to one end wall of the separator vessel, the first heat exchanger comprising:
      (a) a plurality of heat transfer walls of substantially disklike shape peripherally fluid-tightly joined in stacked and spaced relationship to each other;
      (b) there being a first and a second pair of spaced openings defined through each heat transfer wall;
      (c) each heat transfer wall being additionally fluid-tightly joined to an adjacent heat transfer wall on one side thereof at their edges bounding the first pairs of openings, and to another adjacent heat transfer wall on another side thereof at their edges bounding the second pairs of openings, whereby a first set of flow paths, intercommunicated by the first pairs of openings, and a second set of flow paths, intercommunicated by the second pairs of openings, are formed alternately by and between the heat transfer walls for heat exchange through the heat transfer walls, the first set of flow paths communicating with the through passageway, the second set of flow paths communicating with the separator chamber;

(d) means for admitting high-temperature, high-humidity air under pressure into the first set of flow paths and thence into the through passageway; and (e) means for discharging low-humidity air from the second set of flow paths, the low-humidity air being directed from the separator chamber into the second set of flow paths in order to be afterheated by the high-temperature, high-humidity air in the first set of flow paths by heat exchange; and (C) a second heat exchanger of generally cylindrical shape coaxially attached to the other end wall of the separator vessel, the second heat exchanger comprising:

(a) a plurality of heat transfer walls of substantially disklike shape peripherally fluid-tightly joined in stacked and spaced relationship to each other;

(b) there being a third and a fourth pair of spaced openings defined through each heat transfer wall of the second heat exchanger;

(c) each heat transfer wall of the second heat exchanger being additionally fluid-tightly joined to an adjacent heat transfer wall on one side thereof at their edges bounding the third pairs of openings, and to another adjacent heat transfer wall on another side thereof at their edges bounding the fourth pairs of openings, whereby a third set of flow paths, intercommunicated by the third pairs of openings, and a fourth set of flow paths, intercommunicated by the fourth pairs of openings, are formed alternately by and between the heat transfer walls for heat exchange through the heat transfer walls, the third set of flow paths communicating with the through passageway for receiving therefrom the high-humidity air which has been precooled by afterheating the low-humidity air in the first heat exchanger, and also with the separator chamber;

(d) means for admitting a coolant into the fourth set of flow paths for cooling the precooled high-humidity air in the third set of flow paths by heat exchange, the cooled high-humidity air being directed from the third set of flow paths into the separator chamber therein to be reduced in humidity; and (e) means for discharging the coolant from the fourth set of flow paths.

7. The dehumidifier of claim 6 wherein the means defining the through passageway comprises a conduit extending through the separator chamber between the pair of end walls of the separator vessel.

* * * * *